(12) United States Patent
Brownlie

(10) Patent No.: US 12,031,362 B2
(45) Date of Patent: Jul. 9, 2024

(54) ACCESSORY FLAP ROTARY LATCH

(71) Applicant: B/E Aerospace, Inc., Winston-Salem, NC (US)

(72) Inventor: Donna C. Brownlie, Northhamptonshire (GB)

(73) Assignee: B/E Aerospace, Inc., Winston-Salem, NC (US)

( * ) Notice: Subject to any disclaimer, the term of this patent is extended or adjusted under 35 U.S.C. 154(b) by 624 days.

(21) Appl. No.: 16/569,196

(22) Filed: Sep. 12, 2019

(65) Prior Publication Data

US 2021/0087865 A1    Mar. 25, 2021

(51) Int. Cl.
*E05C 19/10* (2006.01)
*B64D 11/04* (2006.01)
*E05B 41/00* (2006.01)

(52) U.S. Cl.
CPC .............. *E05C 19/10* (2013.01); *E05B 41/00* (2013.01); *B64D 11/04* (2013.01)

(58) Field of Classification Search
CPC ......... E05B 41/00; E05C 19/00; B64D 11/04; Y10T 292/0911; Y10T 292/0945; Y10T 292/1039; Y10T 292/104; Y10T 292/1041; Y10T 292/1075; Y10T 292/1077; Y10T 292/1043
See application file for complete search history.

(56) References Cited

U.S. PATENT DOCUMENTS 7,665,775 B1 * 2/2010 Miller ................. E05B 65/0841
                                              292/DIG. 20
10,472,068 B2 * 11/2019 Coombs ................ F25D 17/045
2005/0072324 A1    4/2005 Paleschuck
2008/0203736 A1    8/2008 Ramsauer
2008/0238109 A1 * 10/2008 Huang ..................... E05C 19/10
                                                    292/95
2012/0103206 A1 * 5/2012 Doaran .............. B64D 11/0007
                                                  100/193
2017/0342740 A1 * 11/2017 Basavaraju ............. E05B 41/00
2018/0209185 A1 * 7/2018 Long ...................... B64D 11/02
2019/0031348 A1 * 1/2019 Bajorat .................... B64D 9/00
2019/0063112 A1    2/2019 Carabalona
2020/0157851 A1 * 5/2020 Fodstad .............. E05B 65/1093

FOREIGN PATENT DOCUMENTS

CN            2613559        4/2004
DE     102014104921 A1    10/2015
GB           2510470 B      12/2015

OTHER PUBLICATIONS

Extended Search Report for European Application No. 20195794.1 dated Feb. 8, 2021, 8 pages.
Intention to Grant in European Application No. 20195794.1 dated Jul. 22, 2022, 31 pages.
Office Action in Chinese Application No. 202010952279.9 dated Nov. 30, 2022, 14 pages (with English Translation).

* cited by examiner

*Primary Examiner* — Christine M Mills
*Assistant Examiner* — Yahya Sidky
(74) *Attorney, Agent, or Firm* — Suiter Swantz IP

(57) ABSTRACT

An articulable panel in an aircraft galley includes one or more latches to secure the articulable panel in three dimensions and maintain the structural, load bearing integrity of the overall structure. The latches include color-coded indicators for a quick visual verification that the latches are secured.

17 Claims, 12 Drawing Sheets

ACCESSORY FLAP ROTARY LATCH

BACKGROUND

On modern aircraft carrying large numbers of passengers, incidences of illness are becoming more frequent. If an incapacitated passenger or crew member requires removal from the cabin on a stretcher, the severe spatial restrictions caused by the close proximity of the aircrafts Galleys to each other and the narrowness of the access aisles, can hinder the free movement of first aiders with a stretcher and even prevent the successful evacuation of the patient from the aircraft.

The structures that hinder movement of a stretcher within the aircraft are necessary to the safety and integrity of portions of the aircraft such as the galley, so they cannot be removed or significantly compromised.

SUMMARY

In one aspect, embodiments of the inventive concepts disclosed herein are directed to an articulable panel with one or more latches to secure the articulable panel in three dimensions and maintain the structural, load bearing integrity of the overall structure.

In a further aspect, the latches include color-coded indicators for a quick visual verification that the latches are secured.

It is to be understood that both the foregoing general description and the following detailed description are exemplary and explanatory only and should not restrict the scope of the claims. The accompanying drawings, which are incorporated in and constitute a part of the specification, illustrate exemplary embodiments of the inventive concepts disclosed herein and together with the general description, serve to explain the principles.

BRIEF DESCRIPTION OF THE DRAWINGS

The numerous advantages of the embodiments of the inventive concepts disclosed herein may be better understood by those skilled in the art by reference to the accompanying figures in which.

DETAILED DESCRIPTION

Figure 1A:
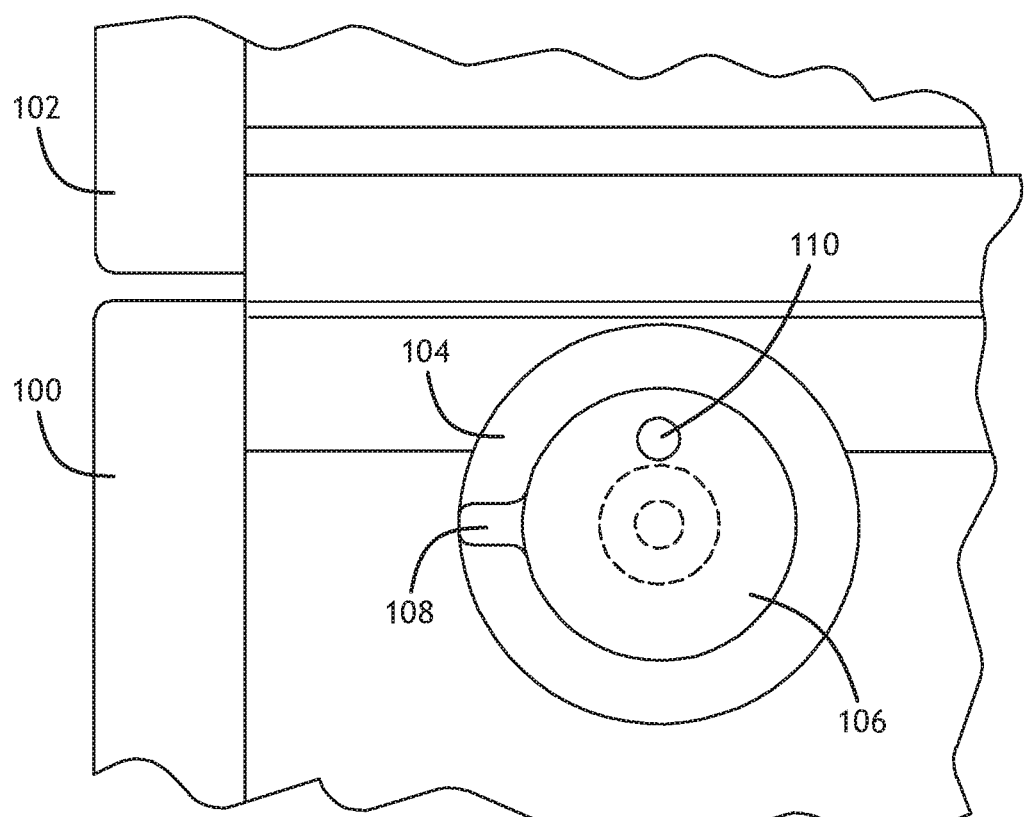
FIG. 1A shows a front view of a latch according to an exemplary embodiment of the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to an articulable panel with one or more latches to secure the articulable panel in three dimensions and maintain the structural, load bearing integrity of the overall structure. The latches include color-coded indicators for a quick visual verification that the latches are secured.

Figure 1B:
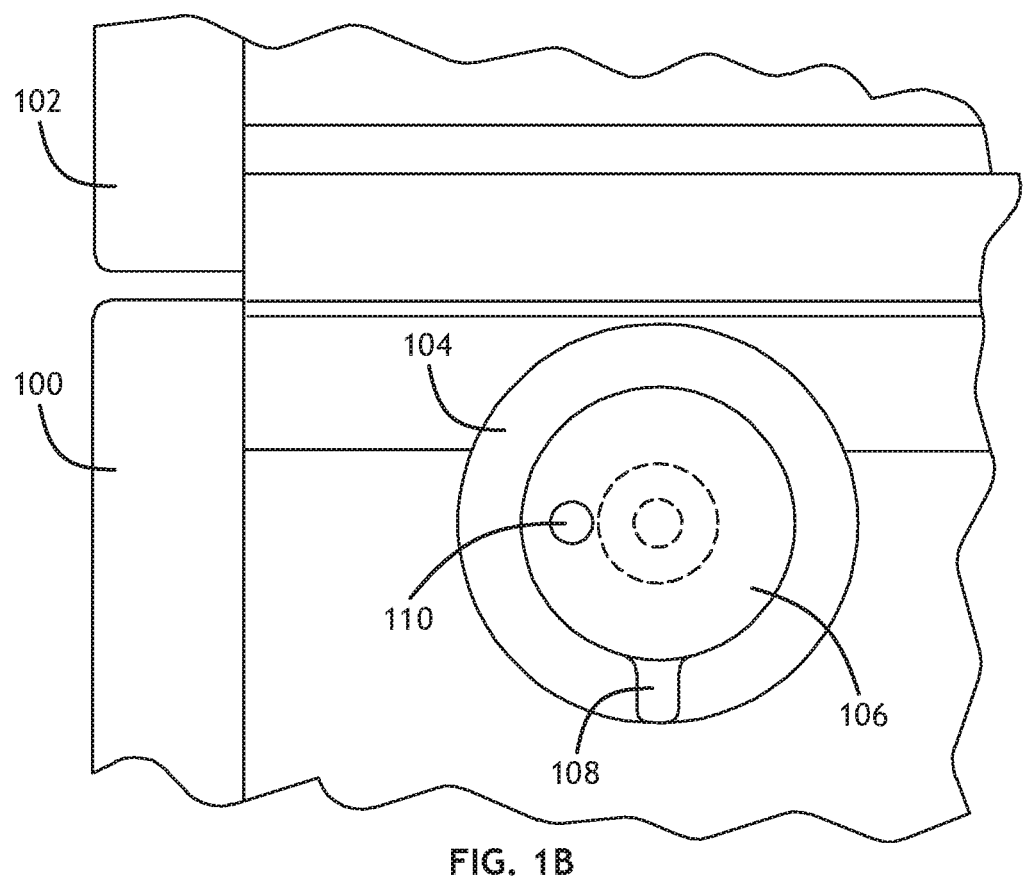
FIG. 1B shows a front view of the latch of FIG. 1A according to an exemplary embodiment of the inventive concepts disclosed herein.

Referring to FIGS. 1A and 1B, front views of a latch according to an exemplary embodiment of the inventive concepts disclosed herein are shown. A system of panels 100, 102 includes a first panel 100 having a self-contained latch mechanism 104 as more fully defined herein, and a second panel 102 that defines a catch.

In at least one embodiment, the latch mechanism 104 includes a rotary handle 106. A latch hook disposed on a barrel connected to the rotary handle 106 is configured to travel within a latch hook recess defined by the second panel 102 and engage the catch when the rotary handle 106 and corresponding barrel are turned.

In at least one embodiment, the rotary handle 106 includes a protrusion 108 to facilitate rotation and to give the user a general visual indication of the latch mechanism 104 is engaged. The rotary handle 106 may also define a latch state indication window 110. The latch state indication window 110 allows the user to see color-coded indicators beneath the rotary handle 106 that indicate the state of the latch mechanism 104.

Figure 2A:
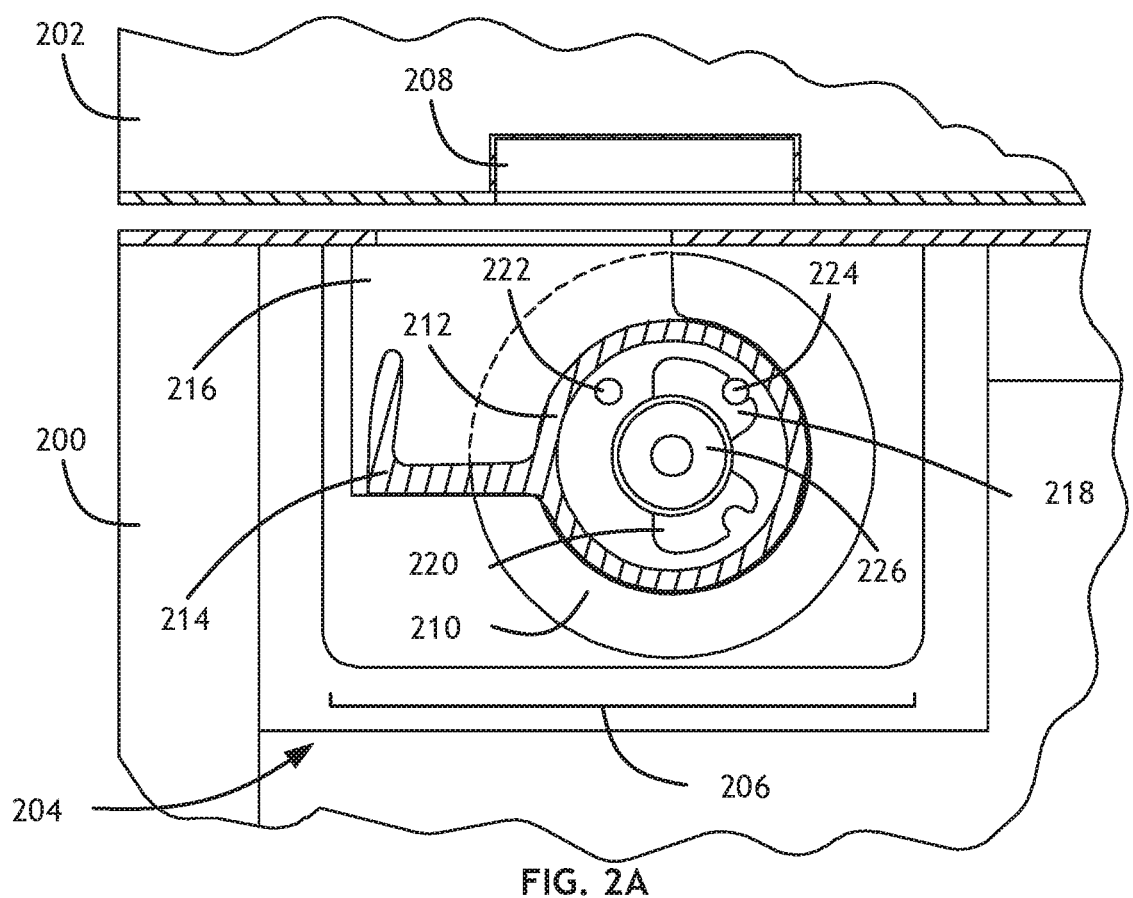
FIG. 2A shows a sectional view of a latch according to an exemplary embodiment of the inventive concepts disclosed herein.
Figure 2B:
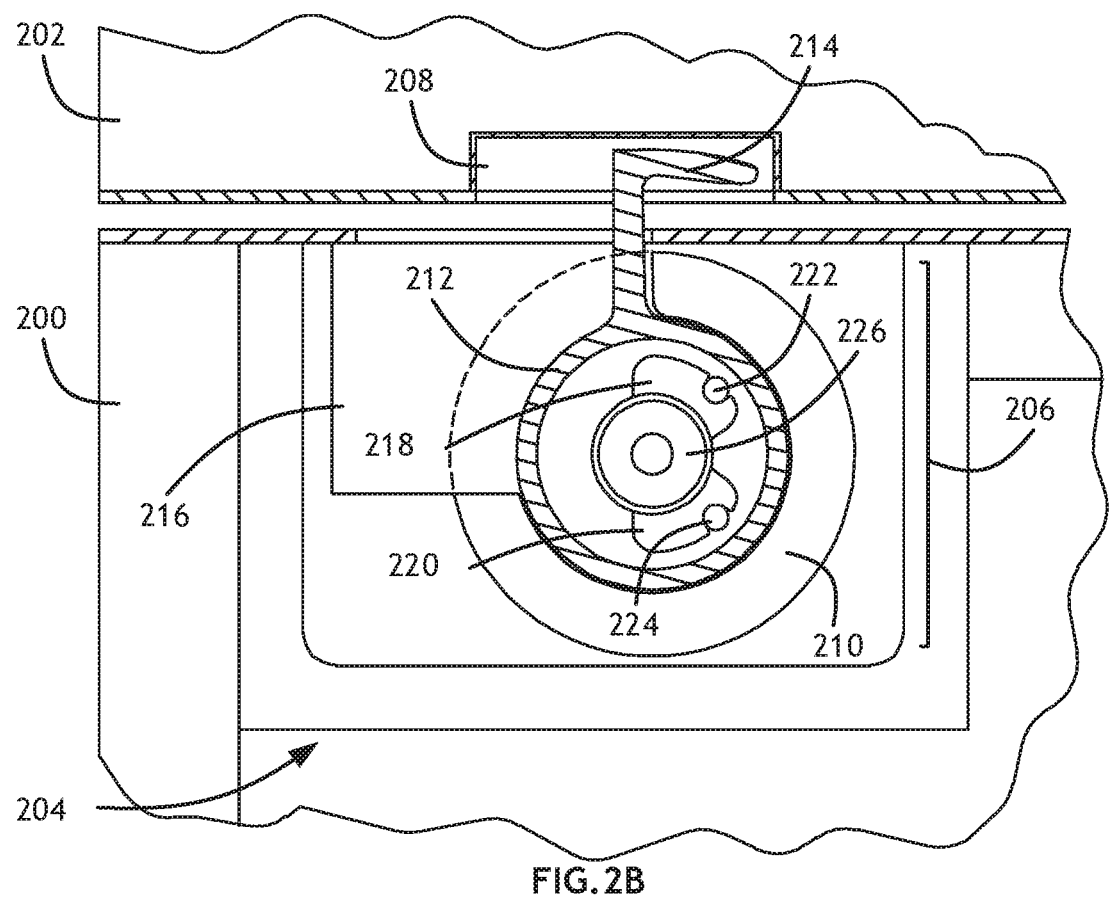
FIG. 2B shows a sectional view of the latch of FIG. 2A according to an exemplary embodiment of the inventive concepts disclosed herein.

Referring to FIGS. 2A and 2B, sectional views of a latch according to an exemplary embodiment of the inventive concepts disclosed herein are shown. A system of panels 200, 202 includes a first panel 200 that defines a latch housing 204 that receives a self-contained latch mechanism 206, and a second panel 202 that defines a catch 208. The latch mechanism 206 and catch 208 operate to secure the first panel 200 in all three dimensions with respect to the second panel 202.

In at least one embodiment, the latch mechanism 206 defines a latch barrel housing 210 to retain a latch barrel 212 and at least partially define the range of rotation of the barrel 212. A latch hook 214 disposed on the barrel 212 is configured to travel within a latch hook recess 216 and engage the catch 208 in the second panel 202 when the barrel 212 is turned. The latch hook 214 may engage a latch plate in the catch 208 to prevent movement up and down. The catch 208 is defined by the second panel 202 on all sides except the bottom where the latch hook 214 engages, so the first panel 200 is secured laterally. Finally, the latch hook 214 extends to fill a significant portion of the catch 208 to prevent protrusion.

In at least one embodiment, the latch mechanism 206 comprises one or more detents 218, 220 configured to retain the barrel 212 in an open configuration (as in FIG. 2A) where the latch hook 214 is disengaged from the catch 208, or in a closed configuration (as in FIG. 2B) where the latch hook 214 is engaged with the catch 208. In one embodiment, the detents 218, 220 are disposed on a fixed central column 226 while one or more detent posts 222, 224 are disposed on an interior surface of the barrel 212 and configured to engage the detent 218, 220. Alternatively, the detents 218, 220 are disposed on the barrel 212 while the one or more detent posts 222, 224 are disposed on the central column 226. In at least one embodiment, the detents 218, 220 and detent posts 222, 224 may be disposed in such a way that when the latch mechanism 206 is in a closed configuration, a first detent 218 engages a first detent post 222 and a second detent 220 engages a second detent post 224; likewise, in an open configuration, the first detent 218 engages the second detent post 224 while the second detent 220 and first detent post 222 are unengaged.

Figure 3:
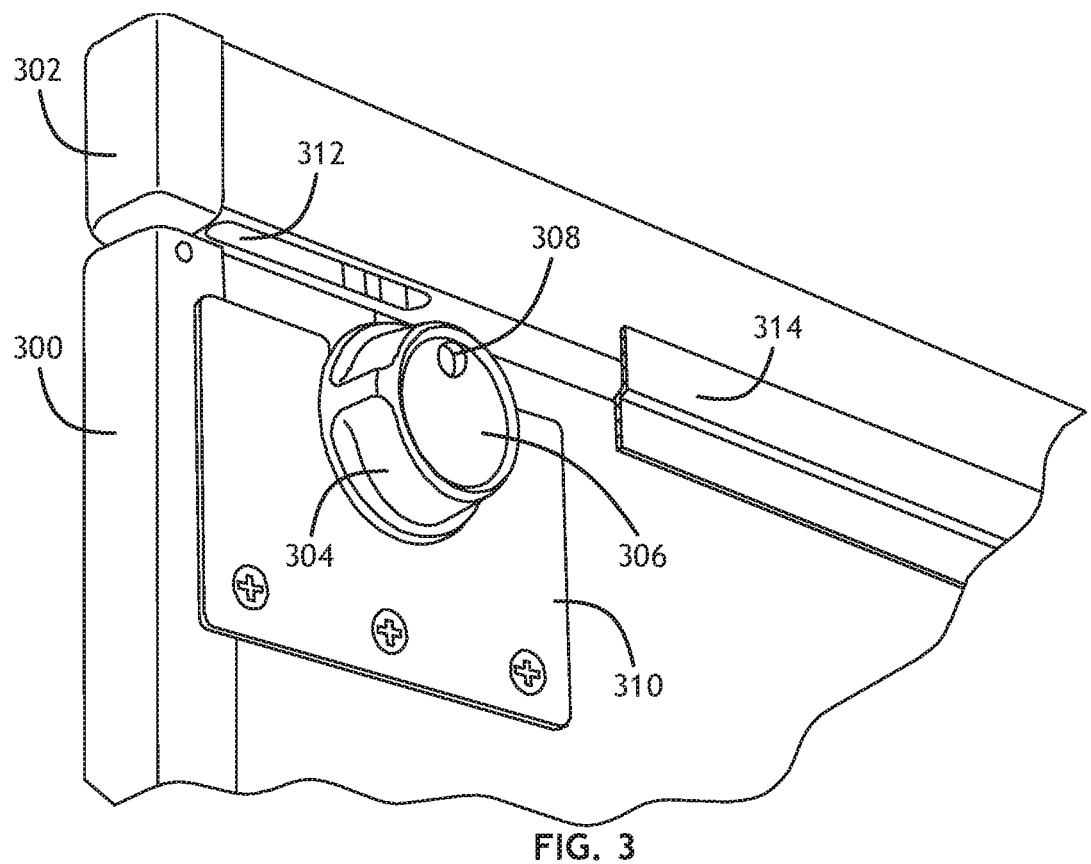
FIG. 3 shows a perspective environmental view of a latch according to an exemplary embodiment of the inventive concepts disclosed herein.

Referring to FIG. 3, a perspective environmental view of a latch according to an exemplary embodiment of the inventive concepts disclosed herein is shown. A first panel 300 includes a latch mechanism and a second panel 302 defines a catch 312 to retain a latch hook of the latch mechanism. The latch mechanism may comprise a self-contained unit installed in the first panel 300 and retained in position by a cover plate 310.

The latch mechanism comprises barrel housing 304 to control the rotation of the latch hook and a barrel cap 306. The barrel cap 306 may define an indicator opening 308 to allow a view of an underlying surface in both an open configuration and a closed configuration. In at least one embodiment, the barrel cap 306 is affixed to the barrel housing 304 while the underlying surface is relatively stationary. The underlying surface may include an artifice, such as a color disparity, to indicate whether the latch mechanism is in the open configuration or closed configuration via the shifting position of the indicator opening 308. Alternatively, the barrel cap 306 may be affixed to an underlying central column and the surface including the artifice is disposed on a rotating element affixed to the barrel housing 304 such that the indicator opening remains relatively stationary.

In at least one embodiment, a panel alignment plate 314 restricts the movement of either the first panel 300 or the second panel 302 in one direction. For example, where the function of the latch mechanism is to retain the first panel 300 in position during normal operation but allow the first panel 300 to be placed in a deflected orientation in the event of an emergency, the panel alignment plate 314 may restrict the motion of the first panel 300 to conform with the desired deflected orientation.

Figure 4:
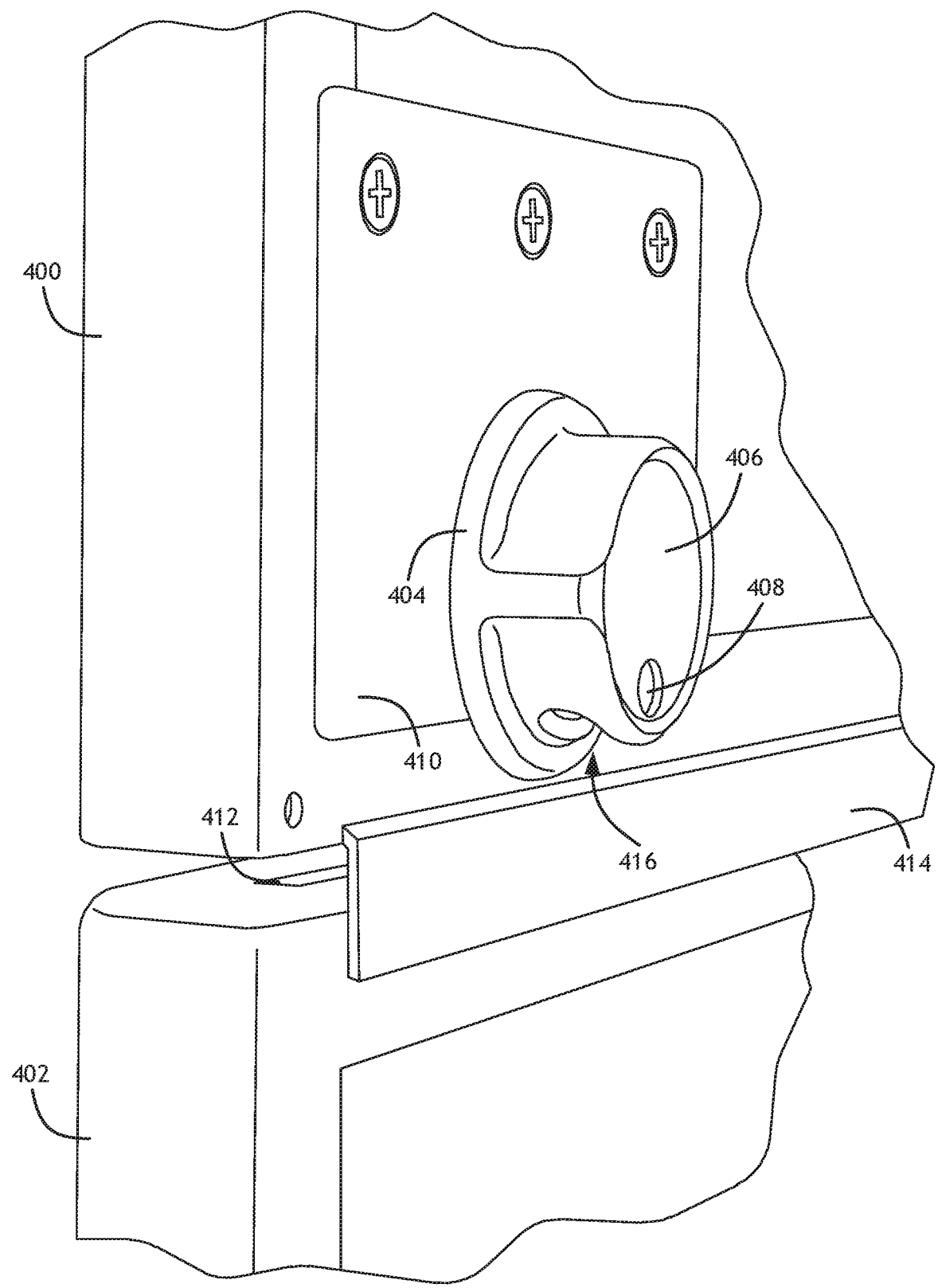
FIG. 4 shows a perspective view of a latch according to an exemplary embodiment of the inventive concepts disclosed herein.

Referring to FIG. 4, a perspective view of a latch according to an exemplary embodiment of the inventive concepts disclosed herein is shown. A first panel 400 includes a latch mechanism and a second panel 402 defines a catch 412 to retain a latch hook of the latch mechanism. The latch mechanism may comprise a self-contained unit installed in the first panel 400 and retained in position by a cover plate 410. The latch mechanism comprises barrel housing 404 and a barrel cap 406 defining a cap indicator opening 408 to allow a view of an underlying surface in both an open configuration and a closed configuration. The barrel cap 406 may be affixed to the barrel housing 404 while the underlying surface is relatively stationary, the barrel cap 406 may be affixed to an underlying central column and the underlying surface affixed to the barrel housing 404 such that the indicator opening remains relatively stationary, such that a user can determine whether the latch mechanism is in the open configuration or closed configuration via an indicator viewable through the cap indicator opening 408.

In at least one embodiment, a panel alignment plate 414 restricts the movement of either the first panel 400 or the second panel 402 in one direction. For example, where the function of the latch mechanism is to retain the first panel 400 in position during normal operation but allow the first panel 400 to be placed in a deflected orientation in the event of an emergency, the panel alignment plate 414 may restrict the motion of the first panel 400 to conform with the desired deflected orientation.

In at least one embodiment, the barrel housing 404 defines a barrel indicator opening 416. When a trolley is stowed in the corresponding bay, a cap indicator opening 408 may be obscured. The barrel indicator opening 416 allows a user to see an indicator beneath the barrel 404 indicating whether the latch mechanism is opened or closed even when a trolley is stowed in the bay. In at least one embodiment, the barrel indicator opening 416 may be obscured (for example, facing the floor) when the latch mechanism is in one configuration and visible when the latch mechanism is in a second configuration. For example, when the latch mechanism is in a closed or latched configuration, the barrel indicator opening 416 may be obscured (facing the floor and not visible), while when the latch mechanism is in an open or unlatched configuration, the barrel indicator opening 416 is visible creating an obvious warning that the latch mechanism is not engaged even when a trolley is stowed in the corresponding bay.

Figure 5A:
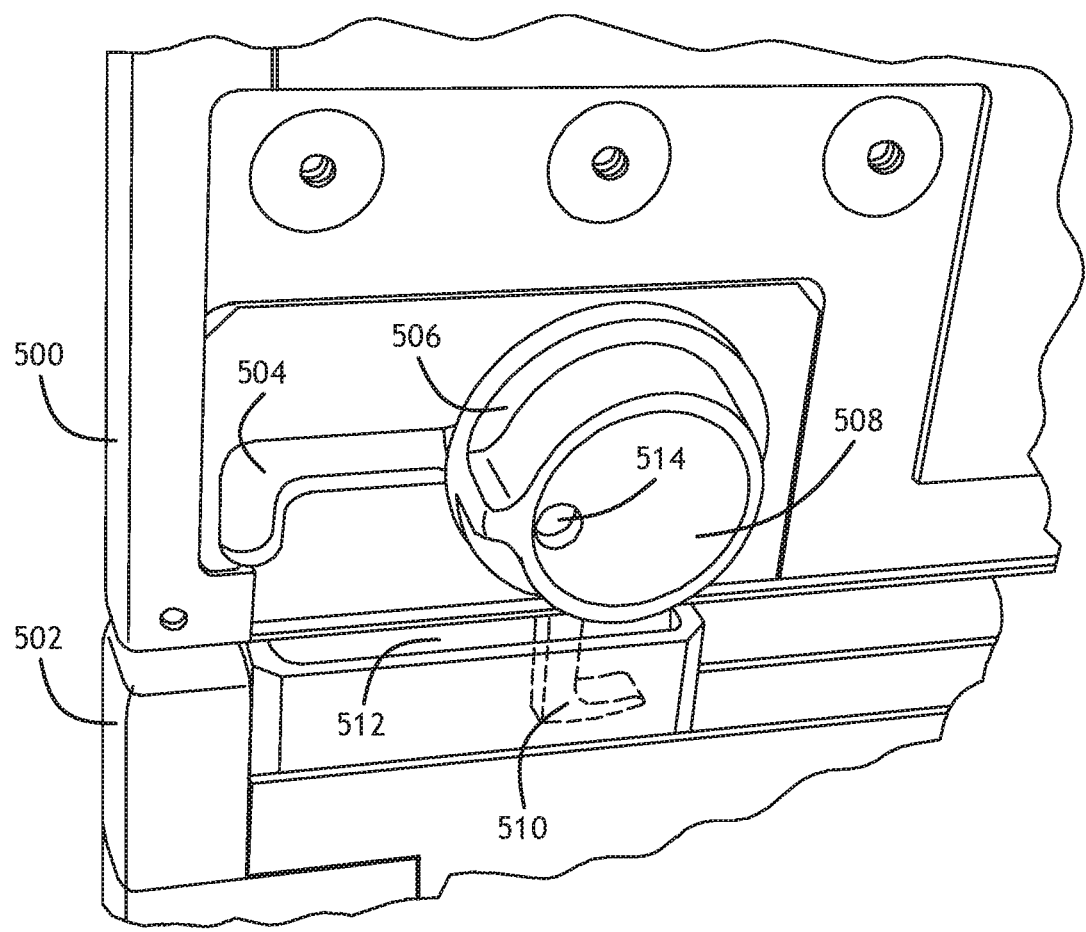
FIG. 5A shows a perspective view of a latch according to an exemplary embodiment of the inventive concepts disclosed herein.
Figure 5B:
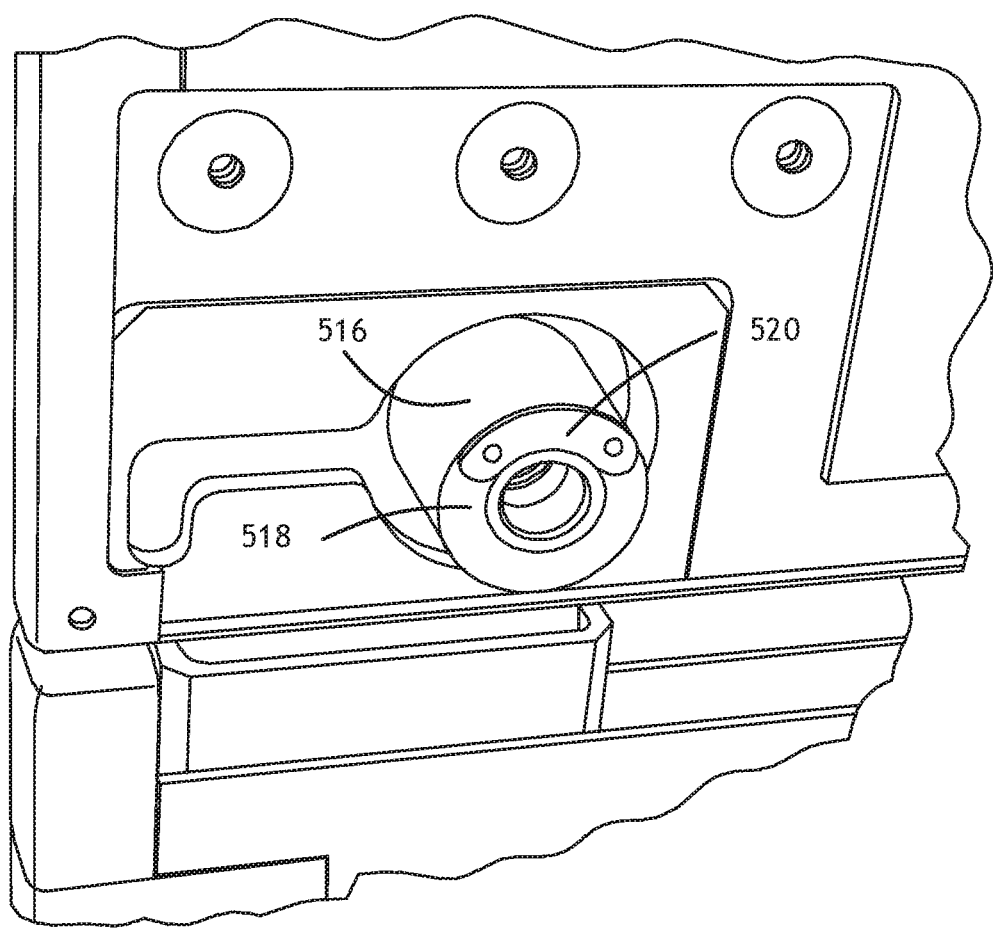
FIG. 5B shows a perspective view of the latch of FIG. 5A according to an exemplary embodiment of the inventive concepts disclosed herein.

Referring to FIGS. 5A and 5B, perspective views of a latch according to an exemplary embodiment of the inventive concepts disclosed herein are shown. A first panel 500 includes a latch mechanism and a second panel 502 defines a catch 512 to retain a latch hook 510 of the latch mechanism. The latch mechanism may comprise a self-contained unit installed in the first panel 500. The latch mechanism comprises barrel housing 506 and a barrel cap 508 defining a cap indicator opening 514 to allow a view of an underlying surface 518 in both an open configuration and a closed configuration. The barrel cap 508 may be affixed to the barrel housing 506 while the underlying surface 518 is relatively stationary, the barrel cap 508 may be affixed to an underlying central column 516 and the underlying surface 518 affixed to the barrel housing 506 such that the indicator opening remains relatively stationary so that a user can determine whether the latch mechanism is in the open configuration or closed configuration via an indicator viewable through the cap indicator opening 514.

In at least one embodiment, the barrel housing 506, barrel cap 508, and connected latch hook 510 comprise a single removable component where the barrel housing 506 may engage or disengage the underlying central column 518 when the latch hook 510 is aligned to a latch hook opening 504 defined by the latch mechanism or the first panel 500.

Figure 6:
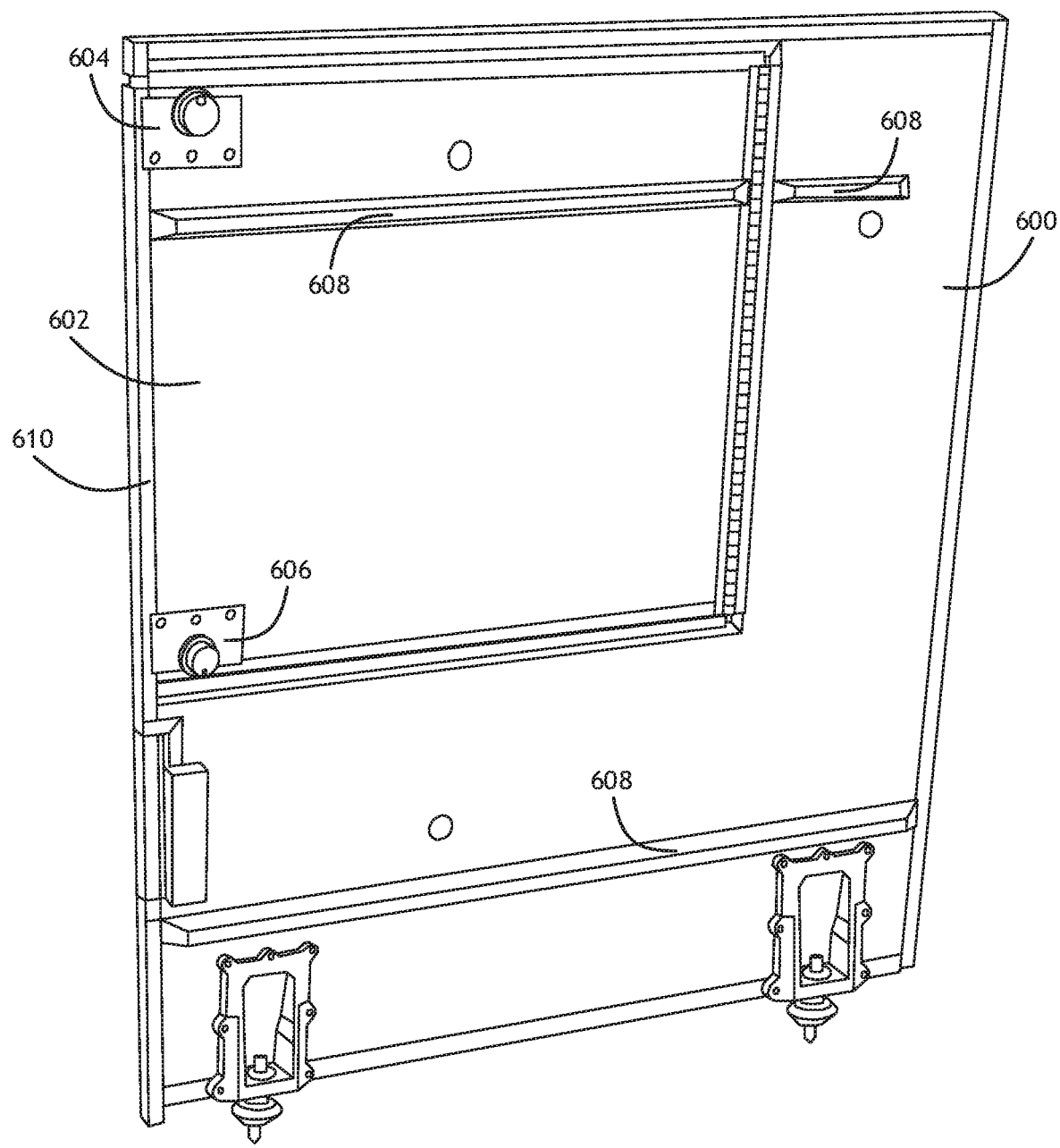
FIG. 6 shows a perspective view of a panel including latches according to an exemplary embodiment of the inventive concepts disclosed herein.

Referring to FIG. 6, a perspective view of a panel 600 including latches 604, 606 according to an exemplary embodiment of the inventive concepts disclosed herein is shown. Where an aircraft function requires more clearance than generally provided by the panels 600 installed in the aircraft, such as in the galley, the panels 600 may define a moveable section 602 secured by one or more latch mechanisms 604, 606 as described herein. In at least one embodiment, the panels 600 or moveable sections 602, or both, may include bumpers 608 configured to protrude from the surface of the corresponding panel 600 or moveable section 602 at least as much as the latch mechanisms 604, 606 to prevent carts or trolleys from striking the latch mechanisms 604, 606.

The panels 600 comprise load bearing structures in many applications. It is critical therefore that the moveable panel 602 be retained in place during regular operations to ensure loads may still be transferred, even in high stress situations. In at least one embodiment, the moveable panel 602 includes a frame 610 disposed around the entire perimeter of the moveable panel 602 to increase the rigidity of the moveable panel 602. The latch mechanisms 604, 606 are critical to the load bearing capabilities of the panel 600 retaining the moveable panel 602 in all three planes to keep both latch mechanisms 604, 606 engaged regardless of the relative movement of the galley in relation to the upper and lower attachments.

Latch mechanisms 604, 606 as described herein positively secure the moveable section 602 in all three dimensions with respect to the surrounding panel 600.

Figure 7:
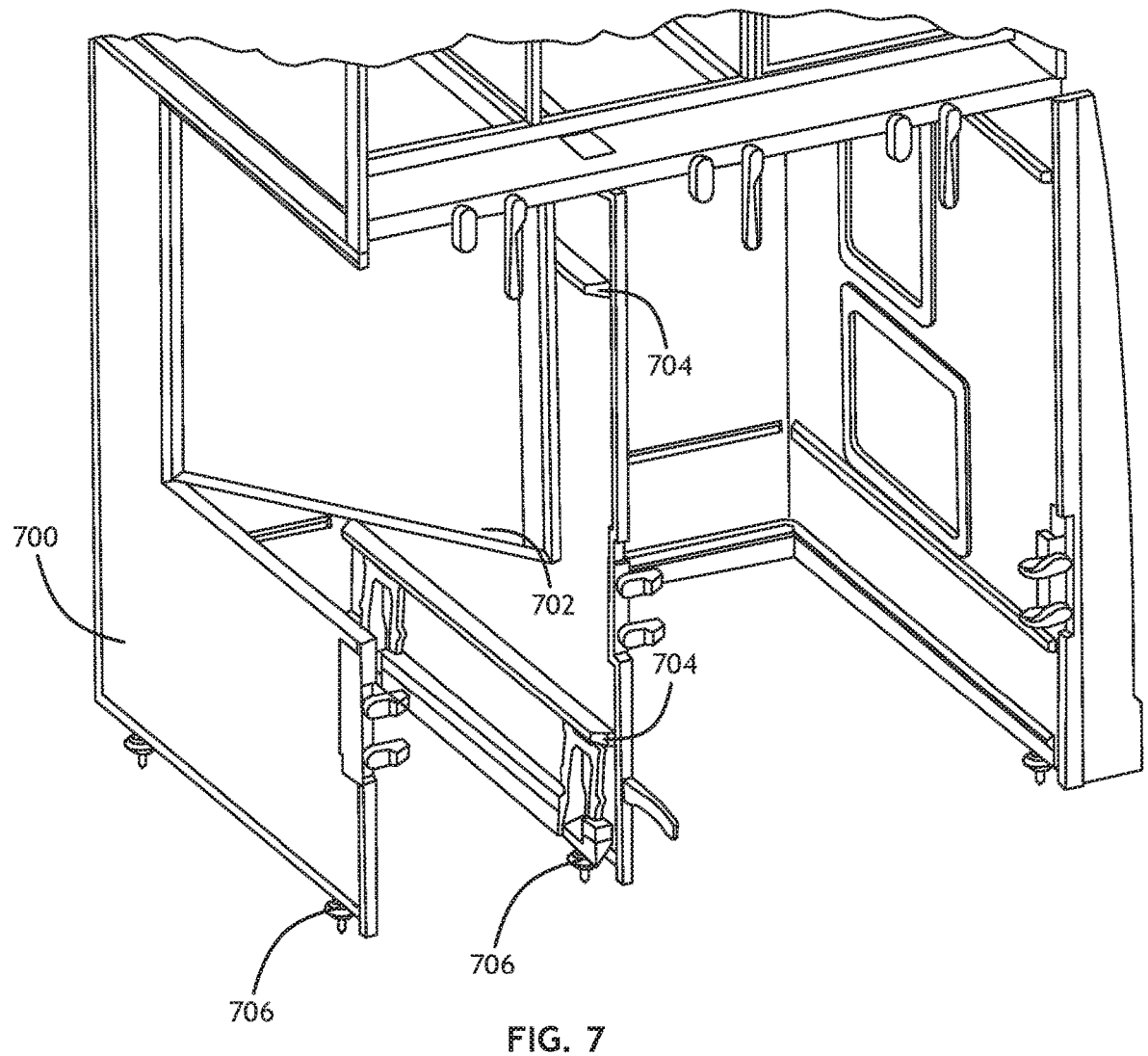
FIG. 7 shows a perspective view of an aircraft galley component including an accessory panel with latches according to an exemplary embodiment of the inventive concepts disclosed herein.

Referring to FIG. 7, a perspective view of an aircraft galley component including an accessory panel with latches according to an exemplary embodiment of the inventive concepts disclosed herein is shown. Where a panel 700 includes a moveable section 702, latch mechanisms may be disengaged and the moveable section 702 internally deflected to abut one or more internal bumpers 704 that define a maximum deflection. The panel 700 may be secured by floor attachment features 706 engaging hard points or seat tracks disposed in the floor.

Figure 8:
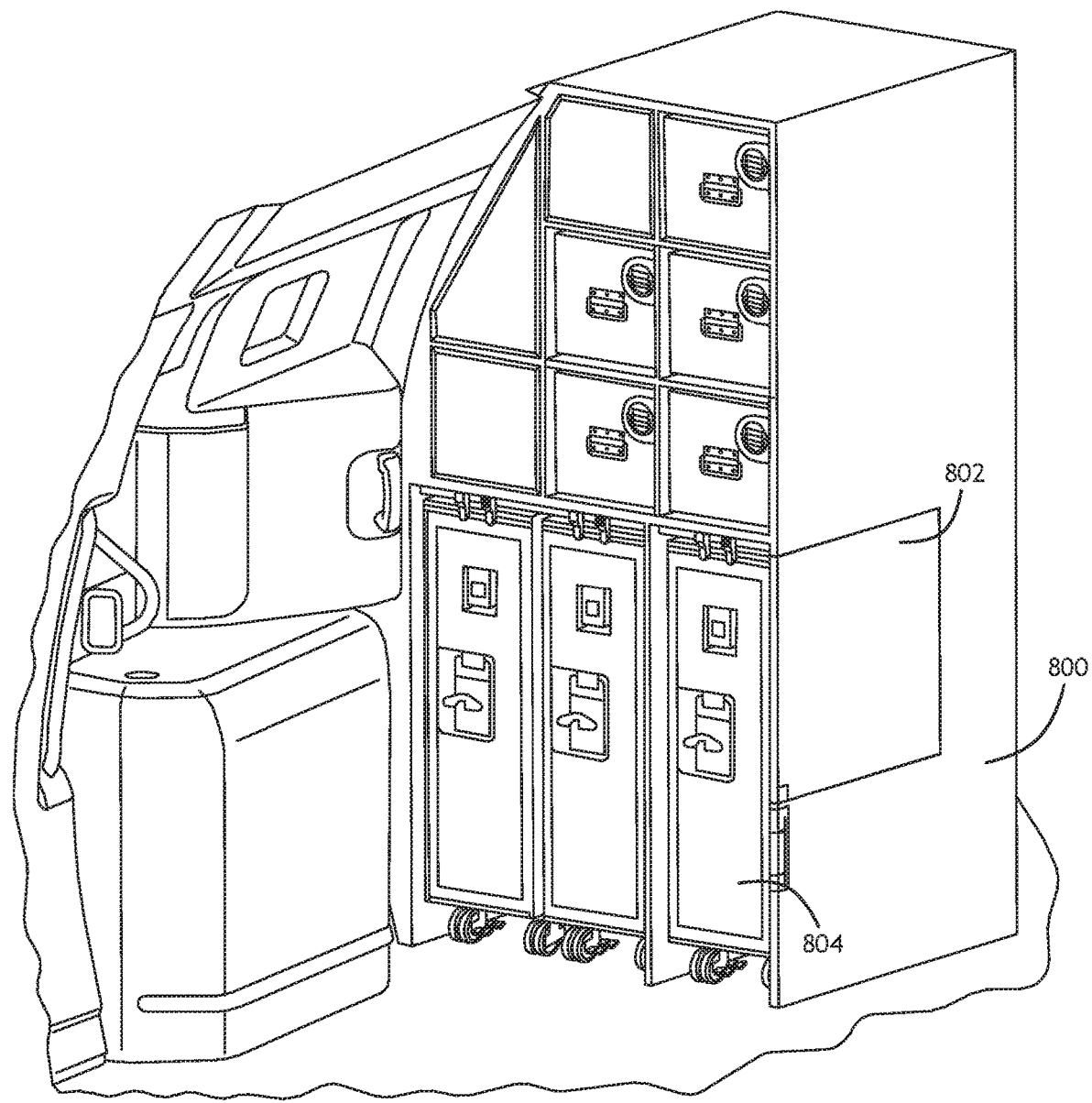
FIG. 8 shows an environmental view of an aircraft galley component including an accessory panel with latches according to an exemplary embodiment of the inventive concepts disclosed herein.
Figure 9:
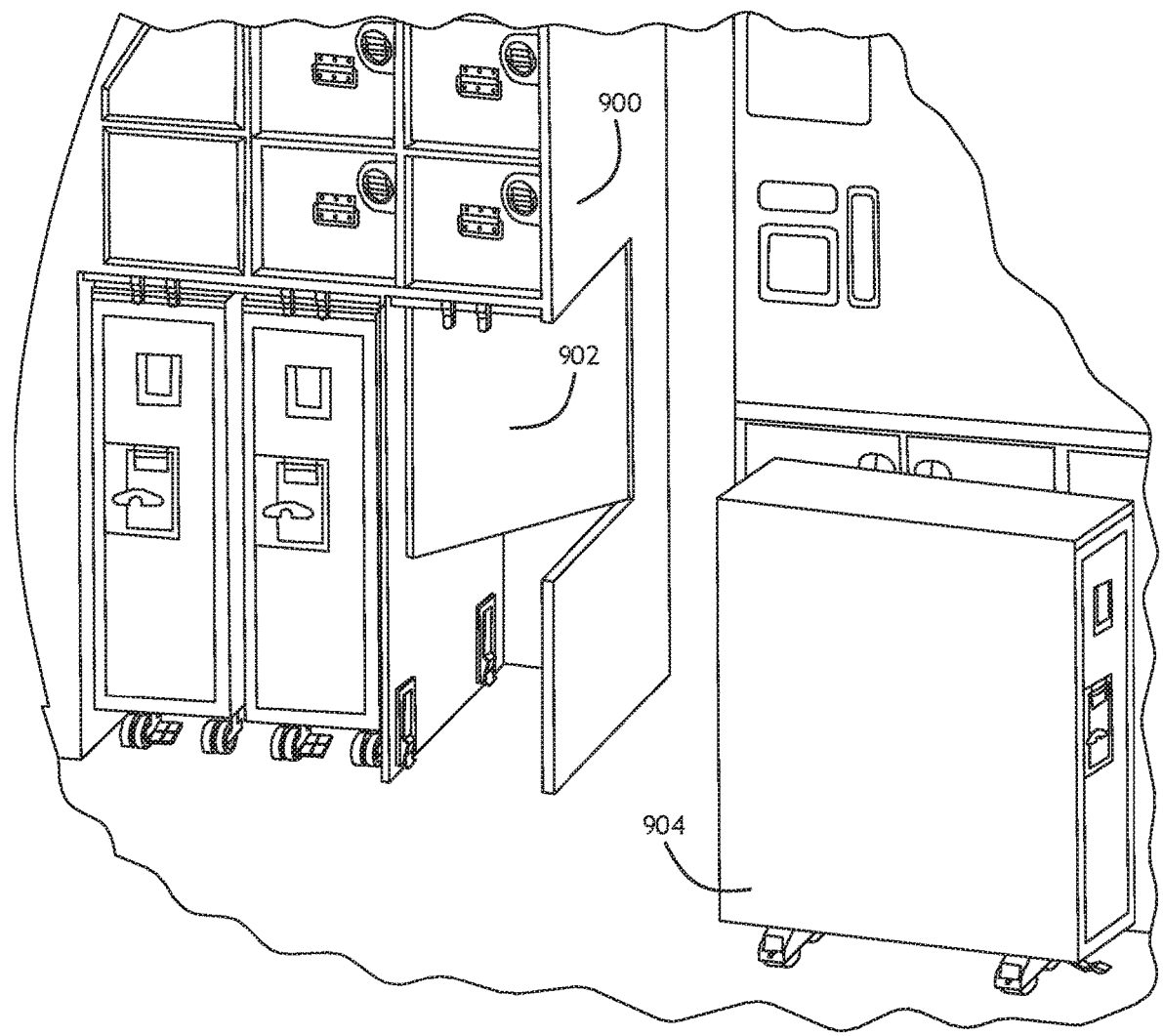
FIG. 9 shows an environmental view of an aircraft galley component including an accessory panel with latches according to an exemplary embodiment of the inventive concepts disclosed herein.

Referring to FIGS. 8 and 9, environmental views of an aircraft galley component including an accessory panel with latches according to an exemplary embodiment of the inventive concepts disclosed herein is shown. A panel 800 including a moveable section 802 may be normally maintained in a closed orientation to define a space suitable for a galley cart 804 (trolley). The galley cart 804 may be removed to make room for the moveable section 802 to deflect inward and provide additional clearance in the outside walkways, for example to turn a long structure that would otherwise not have sufficient clearance.

It is believed that the inventive concepts disclosed herein and many of their attendant advantages will be understood by the foregoing description of embodiments of the inventive concepts disclosed, and it will be apparent that various changes may be made in the form, construction, and arrangement of the components thereof without departing from the broad scope of the inventive concepts disclosed herein or without sacrificing all of their material advantages; and individual features from various embodiments may be combined to arrive at other embodiments. The form herein before described being merely an explanatory embodiment thereof, it is the intention of the following claims to encompass and include such changes. Furthermore, any of the features disclosed in relation to any of the individual embodiments may be incorporated into any other embodiment.

What is claimed is:

1. An accessory latch comprising:
   a rotary handle;
   a fixed central column rotatably connected to the rotary handle, and disposed within the rotary handle;
   a latch hook disposed on the rotary handle;
   a latch housing that defines a latch hook recess and a latch hook opening; and
   a latch state indication window defined by the rotary handle,
   wherein:
   the latch state indication window provides visibility to a first color-coded indicator disposed at a first fixed position relative to the fixed central column when the rotary handle is in a latched orientation and a second color-coded indicator disposed at a second fixed position relative to the fixed central column when the rotary handle is in an unlatched orientation;
   the latch hook recess comprises a channel defining an unlatched terminus of the latch hook and a latched terminus of the latch hook;
   the latch hook is configured to engage a catch when the rotary handle is in the latched orientation; and the latch hook opening is aligned to the latch hook and configured to allow the rotary handle and latch hook to be removed from the latch housing.

2. The accessory latch of claim 1, further comprising:
at least two detents disposed on the fixed central column;
one or more detent posts disposed on the rotary handle, at least one of the one or more detent posts configured to engage a first detent of the at least two detents when the rotary handle is in the latched orientation, and a second detent of the at least two detents when the rotary handle is in the unlatched orientation.

3. The accessory latch of claim 1, wherein the latch housing contains all of the components for the accessory latch such that the latch housing comprises a single component installable in an accessory panel.

4. An aircraft accessory panel comprising:
at least one accessory latch comprising:
a rotary handle;
a fixed central column rotatably connected to the rotary handle, and disposed within the rotary handle;
a latch hook disposed on the rotary handle;
a latch housing that defines a latch hook recess and a latch hook opening; and
a latch state indication window defined by the rotary handle,
wherein:
the latch state indication window provides visibility to a first color-coded indicator disposed at a first fixed position relative to the fixed central column when the rotary handle is in a latched orientation and a second color-coded indicator disposed at a second fixed position relative to the fixed central column when the rotary handle is in an unlatched orientation;
the latch hook recess comprises a channel defining an unlatched terminus of the latch hook and a latched terminus of the latch hook;
the latch hook is configured to engage a catch when the rotary handle is in the latched orientation; and
the latch hook opening is aligned to the latch hook and configured to allow the rotary handle and latch hook to be removed from the latch housing.

5. The aircraft accessory panel of claim 4, wherein each of the at least one accessory latch further comprises:
at least two detents disposed on the fixed central column;
one or more detent posts disposed on the rotary handle, at least one of the one or more detent posts configured to engage a first detent of the at least two when the rotary handle is in the latched orientation, and a second detent of the at least two when the rotary handle is in the unlatched orientation.

6. The aircraft accessory panel of claim 4, wherein the latch housing contains all of the components for the corresponding accessory latch such that the latch housing comprises a single component installable in an accessory panel.

7. The aircraft accessory panel of claim 4, wherein the at least one accessory latch is disposed to protrude from an interior surface of the accessory panel, such protrusion defined by a width of a corresponding cart.

8. The aircraft accessory panel of claim 7, further comprising one or more bumpers disposed on the interior surface of the aircraft accessory panel, the one or more bumpers protruding by at least as much as the at least one accessory latch to prevent the corresponding cart from bumping the at least one accessory latch.

9. The aircraft accessory panel of claim 7, further comprising one or more panel alignment plates disposed on the interior surface of the aircraft accessory panel.

10. The aircraft accessory panel of claim 4, wherein the at least one accessory latch comprises a first accessory latch disposed proximal to a floor surface and a second accessory latch disposed distal to the floor surface.

11. An aircraft comprising:
a first aircraft accessory panel comprising:
at least one accessory latch comprising:
a rotary handle;
a fixed central column rotatably connected to the rotary handle, and disposed within the rotary handle;
a latch hook disposed on the rotary handle;
a latch housing that defines a latch hook recess and a latch hook opening; and
a latch state indication window defined by the rotary handle; and
a second aircraft accessory panel comprising an accessory latch catch, wherein:
the first aircraft accessory panel is connected to the second aircraft accessory panel via a hinge distal to the at least one accessory latch;
the first aircraft accessory panel and second aircraft accessory panel forming a load bearing structure when in a latched orientation;
the latch state indication window provides visibility to a first color-coded indicator disposed at a first fixed position relative to the fixed central column when the rotary handle is in a latched orientation and a second color-coded indicator disposed at a second fixed position relative to the fixed central column when the rotary handle is in an unlatched orientation;
the latch hook recess comprises a channel defining an unlatched terminus of the latch hook and a latched terminus of the latch hook;
the latch hook is configured to engage a catch when the rotary handle is in the latched orientation; and
the latch hook opening is aligned to the latch hook and configured to allow the rotary handle and latch hook to be removed from the latch housing.

12. The aircraft of claim 11, wherein each of the at least one accessory latch further comprises:
at least two detents disposed on the fixed central column;
one or more detent posts disposed on the rotary handle, at least one of the one or more detent posts configured to engage a first detent of the at least two when the rotary handle is in the latched orientation, and a second detent of the at least two when the rotary handle is in the unlatched orientation.

13. The aircraft of claim 11, wherein the latch housing contains all of the components for the corresponding accessory latch such that the latch housing comprises a single component installable in an accessory panel.

14. The aircraft of claim 11, wherein the at least one accessory latch is disposed to protrude from an interior surface of the accessory panel, such protrusion defined by a width of a corresponding cart.

15. The aircraft of claim 14, further comprising one or more bumpers disposed on the interior surface of each aircraft accessory panel, the one or more bumpers protruding by at least as much as the at least one accessory latch to prevent the corresponding cart from bumping the at least one accessory latch.

16. The aircraft of claim 14, further comprising one or more panel alignment plates disposed on the interior surface of each aircraft accessory panel.

17. The aircraft accessory panel of claim 11, wherein the at least one accessory latch comprises a first accessory latch disposed proximal to a floor surface and a second accessory latch disposed distal to the floor surface.

* * * * *